A. TONINI.
FEED BOX.
APPLICATION FILED OCT. 13, 1910.
1,015,221.
Patented Jan. 16, 1912.
2 SHEETS—SHEET 2.
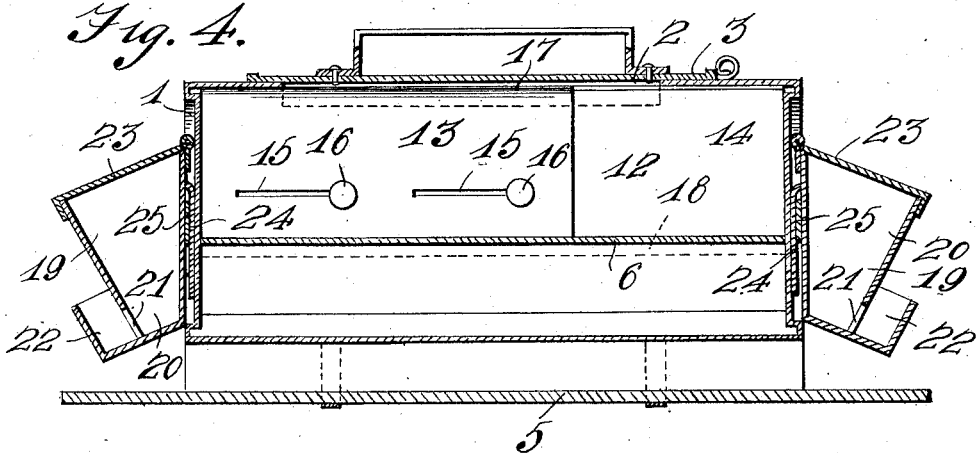
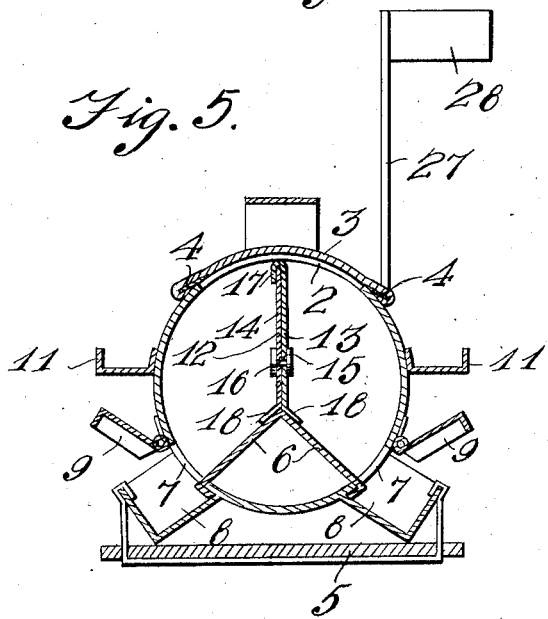
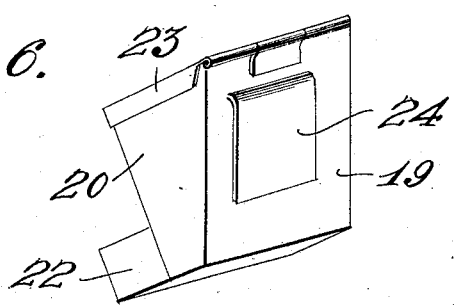
Witnesses
C. P. Hardy
O. B. Hopkins
Inventor
August Tonini
by H. B. Willson & Co.
Attorneys

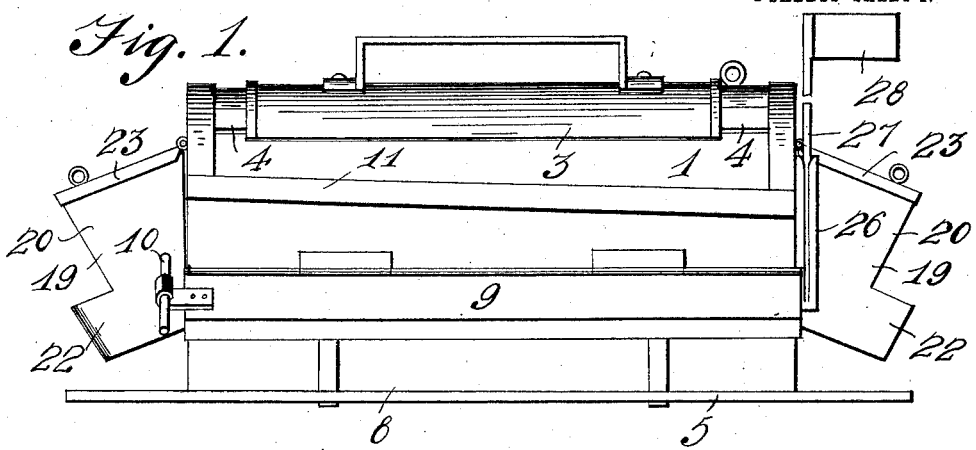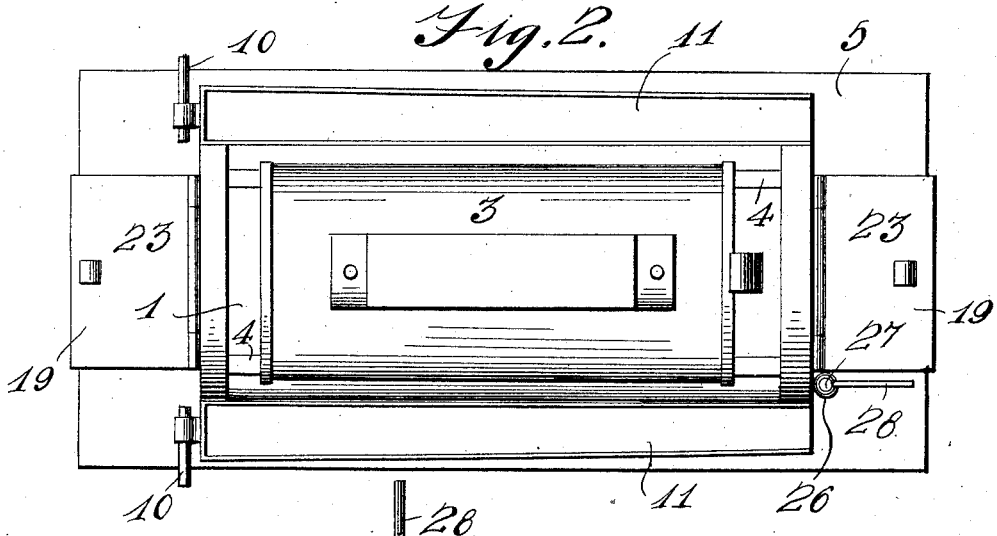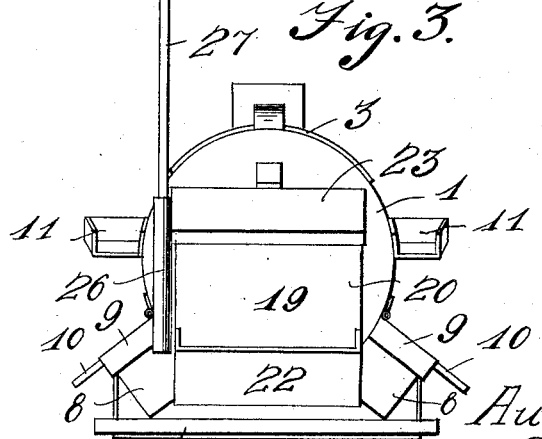

UNITED STATES PATENT OFFICE.

AUGUST TONINI, OF GRANDVIEW, INDIANA.

FEED-BOX.

1,015,221. Specification of Letters Patent. Patented Jan. 16, 1912.

Application filed October 13, 1910. Serial No. 586,933.

*To all whom it may concern:*

Be it known that I, AUGUST TONINI, a citizen of the United States, residing at Grandview, in the county of Spencer and State of Indiana, have invented certain new and useful Improvements in Feed-Boxes; and I do declare the following to be a full, clear, and exact description of the invention, such as will enable others skilled in the art to which it appertains to make and use the same.

This invention relates to improvements in feed boxes for poultry.

One object of the invention is to provide an improved construction and arrangement of feed box whereby different kinds of food may be held in position to be readily reached by the fowls and in which the food will be protected from the weather and from marauding animals.

With this and other objects in view, the invention consists of certain novel features of construction, combination and arrangement of parts as will be more fully described and particularly pointed out in the appended claim.

In the accompanying drawings: Figure 1 is a side view of my improved feed box; Fig. 2 is a top plan view; Fig. 3 is an end view showing the covers of the feed trough closed; Fig. 4 is a central vertical longitudinal sectional view; Fig. 5 is a vertical cross sectional view showing the covers of the feed troughs open; Fig. 6 is a detail perspective view of one of the detachable grit feeding boxes removed from the main feed box.

Referring more particularly to the drawings, 1 denotes my improved feed box which is preferably formed of metal and comprises a cylindrical body portion or hopper closed at its opposite ends and having in its upper side a filling opening 2 adapted to be closed by a cover 3 which is slidably engaged with retaining flanges 4 on the upper side of the body 1 as shown. The body 1 is preferably secured to a base plate 5 whereby the same has a firm support and cannot be readily upset.

Arranged in the body portion or hopper 1 is a longitudinally disposed inverted V-shaped deflecting rib 6 which is adapted to direct the food toward the opposite sides of the hopper in which are formed longitudinal feed passages 7 through which the feed is discharged into suitable troughs 8 arranged along and secured to the opposite sides of the hopper 1 as shown. The troughs 8 are provided with hinged covers 9 by means of which they may be closed when desired thus preventing the removal of the food by rats, mice or other marauding animals. The covers 9 are preferably provided with suitable operating handles 10 whereby they may be readily opened and closed. On the opposite sides of the hopper 1 above the troughs 8 are secured inclined gutters or channels 11 which are provided to catch the rain water running off from the top of the hopper and thus preventing this water from running into the hoppers.

If desired I may provide the hopper 1 with a partition 12 which is here shown and preferably consists of two slidably engaged plates 13 and 14. The plate 13 has formed therein near its lower edge longitudinally disposed slots 15 with which are engaged headed studs 16 secured to the plate 14. The upper edge of the plate 13 is bent or folded over upon itself to form a guide flange 17 with which the upper edge of the plate 14 is slidably engaged. By means of the headed studs 16 and guide flange 17 said plates 13 and 14 are slidably connected together whereby they may be retracted or drawn together to permit the same to be inserted through the filling opening 2 in the body and into engagement with the rib 6 and then expanded or drawn out into engagement with the opposite ends of the body or hopper thus forming the partition 12 whereby the hopper is separated into two compartments and is thus adapted to hold two kinds of food. The lower edges of the plates 13 and 14 are bent outwardly at suitable angles as shown at 18 to provide a space to receive the upper edge of the rib 6 and thus firmly support the partition in position in the hopper, whereby the latter is divided into two compartments and is thus adapted to contain different kinds of food.

Detachably connected to the opposite ends of the body or hopper 1 of the box are small feed boxes 19 adapted to contain grit, charcoal or similar material whereby the fowls may have ready access thereto. The boxes 19 each comprise a hopper 20 having an inclined front wall in the lower edge of which is formed a discharge passage 21 which communicates with a feed trough 22 arranged on the lower end of the hopper as shown. The hoppers 20 are provided with hinged covers 23 arranged at an angle or inclination whereby rain water will readily run off from the same. The feed boxes 19 are provided on their rear or inner sides with offset fastening plates or hooks 24 which are adapted to be hooked into engagement with keeper plates or bars 25 arranged on the opposite ends of the hopper or body 1 whereby said boxes 19 are detachably held in position on the ends of said hopper.

On one end of the hopper 1 adjacent to one side of the feed box 19 at this end of the hopper is arranged a socket 26 adapted to receive and support a flag staff 27 on which is arranged a flag 28 or similar device for the purpose of frightening birds away from the feed box.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claim.

Having thus described my invention, what I claim is:

A feed trough comprising a hopper having oppositely located discharge passages and a filling opening in its top, the length of which is shorter than the length of the hopper, a longitudinally arranged V-shaped deflecting ridge centrally positioned in the hopper, a removable longitudinally extensible partition of two sections adapted to be extended the full length of the hopper, said partition having a forked lower edge adapted for sliding engagement upon the deflecting ridge, the upper edge of one section of the partition being engaged with one end portion of the top of the hopper, whereby said partition will be held in a vertical position, means for slidably connecting said sections of the partition, and a sliding cover for closing the filling opening in the top.

In testimony whereof I have hereunto set my hand in presence of two subscribing witnesses.

AUGUST TONINI.

Witnesses:
B. F. STEWART,
O. P. M. THURMAN.

Copies of this patent may be obtained for five cents each, by addressing the "Commissioner of Patents, Washington, D. C."